United States Patent [19]
Ayer

[11] Patent Number: 5,643,077
[45] Date of Patent: Jul. 1, 1997

[54] CONTINUALLY OPTIMIZED, VARIABLE FLOW RATE VENTILATION SYSTEM

[76] Inventor: Jacqueline Ayer, 16900 Algonquin St. 1-203, Huntington Beach, Calif. 92649

[21] Appl. No.: 491,226

[22] Filed: Jun. 16, 1995

[51] Int. Cl.$^6$ .................................................. B05B 15/12
[52] U.S. Cl. ........................... 454/54; 454/50; 454/53; 454/229
[58] Field of Search .......................... 454/50, 51, 52, 454/53, 54, 55, 229; 118/326, DIG. 7

[56] References Cited

U.S. PATENT DOCUMENTS

| | | | |
|---|---|---|---|
| 3,395,972 | 8/1968 | Hardison | 545/53 X |
| 4,351,863 | 9/1982 | Roesner | 454/53 X |
| 4,687,686 | 8/1987 | Stofleth et al. | 454/54 X |
| 5,290,200 | 3/1994 | Kiser | 454/229 |

FOREIGN PATENT DOCUMENTS

| | | | |
|---|---|---|---|
| 0 584 638 | 8/1994 | European Pat. Off. | 454/50 |
| 2932392 | 2/1981 | Germany | 118/326 |
| 2-183745 | 7/1990 | Japan | 454/229 |
| 629 686 | 5/1982 | Switzerland | 454/53 |

Primary Examiner—Harold Joyce
Attorney, Agent, or Firm—Marianna S. Hamilton, Esq.

[57] ABSTRACT

A ventilation system for use, in example, on a spray booth or paint stripping enclosure, in which variable speed fans (or equivalent) are employed, and controlled by a sensor so that the flow rate exhausted from the booth (and directed either to an emission control device or vented to atmosphere) is continually adjusted to minimize the exhaust flow rate from the enclosure. The remainder of the ventilation air is recirculated back into the enclosure. An analyzer located in the recirculation duct continuously monitors the concentration of hazardous constituents present in the recirculation stream, and transmits this data to a central controller, which controls the ventilation fan systems. The central controller controls the recirculation duct and exhaust duct fan systems to achieve the highest recirculation rate possible, yet also maintain constituent concentrations in the recirculation duct at a safe level. The monitor senses concentrations in the recirculation duct on a virtually continuous basis, and the central controller continually adjusts the flow rate through the recirculation duct and exhaust duct to maintain a constant flow rate through the enclosure.

20 Claims, 4 Drawing Sheets

CONTINUALLY OPTIMIZED, VARIABLE FLOW RATE VENTILATION SYSTEM

TECHNICAL FIELD OF THE INVENTION

The present invention relates generally to ventilation systems that are employed on paint spray booths, chemical paint stripping enclosures, and other enclosures in which operations involving solvents or other hazardous materials are employed, and more particularly, to recirculation ventilation systems, and to such systems that employ variable flow techniques to accomplish ventilation. The enclosure exhaust may be vented to an air pollution control system. The invention may also be used for semiconductor fabrication lines.

BACKGROUND OF THE INVENTION AND RELATED ART

Spray booths and other work areas in which solvents or other hazardous materials are used typically employ a fully or partially enclosed, climate controlled space in which work pieces are coated, stripped, or otherwise processed. Forced draft ventilation air is generally driven through these enclosures to achieve a variety of objectives, including a) removal of overspray particulate, solvent vapors, and/or other hazardous constituents from the worker stationed in or near the area; b) maintaining constituent concentrations in the vicinity of workers present in the enclosure below established safety levels; c) maintaining solvent concentrations in the enclosure and exhaust ducts below lower explosive limit (LEL) concentrations; and/or d) maintaining a clean environment to avoid corrupting the workpiece surface with unwanted contaminants. The minimum required volumetric flow rate through an enclosure is dictated by the enclosure configuration as well as applicable regulations; typically a linear flow rate of 100 feet per minute or more is employed for paint spray operations.

The ventilation air exiting the enclosure often passes through a particulate filtration system before it is exhausted to atmosphere. Occasionally, the exhaust air is vented to an air pollution control system to remove the volatile organic compounds and/or other hazardous constituents before it is vented to atmosphere. This "once-through" mode of operation typically employed for enclosure ventilation systems results in rather high facility air handling costs (e.g. heating, cooling), as well as high air pollution emission control costs due to the large exhaust volume flow rates.

One means that has been used in the field to reduce exhaust air flow rate is the recirculation of a portion of the air back into the enclosure; the remainder is vented either to atmosphere or to an air pollution emission control device. Recirculated air is mixed with fresh make-up air that is brought in to replace the exhaust air. Recirculation enhances the overall cost effectiveness of facility operation, because it reduces air conditioning costs (e.g. heating, cooling) as well as air pollution control system installation and operating costs.

Though there are several ventilation systems known in the art that employ recirculation, every one of them relies on a fixed rate of recirculation, and therefore a fixed recirculated volume flow rate and a fixed exhaust volume flow rate. One reason that the recirculation volume flow rate is fixed is in consideration of applicable safety rules, which stipulate that constituent concentrations in the recirculated stream not exceed a safe level. Thus, recirculation system flow rates are designed and fixed such that constituent concentrations remain at safe levels, even under "worst-case" (i.e. high solvent usage) conditions.

There are no known dynamically optimized recirculating ventilation systems in the prior art. Therefore, it remains an unsolved problem in field to both maintain safe levels of constituent concentrations in the recirculation stream, and continually maximize the recirculation rate to achieve minimal exhaust volume flow rates and thus the costs associated therewith.

In another patent by this inventor, U.S. Pat. No. 5,221,230, a paint spray booth is disclosed in which a split-flow plate is used to segregate a portion of the exhaust air, which is vented to an air pollution control device. The remainder is either recirculated or vented to atmosphere. The location of the split-height is fixed; thus the volume flow rate in each of the two streams created by the "split-flow" plate does not vary. Moreover, the split-height location must be calculated by skilled engineering professionals in order to correctly implement this invention. There is also an inherent danger of the split-height being miscalculated, which could lead to injury. Furthermore, it is based upon a limiting condition that the air flow be not only laminar, but either vertical or horizontal in relation to the walls thereof. Finally, this invention requires that a constituent stratification pattern which occurs naturally in the booth be preserved throughout the booth.

Another paint spraying assembly that employs recirculation to reduce the exhaust flow rate is disclosed by U.S. Pat. No. 4,266,504, by Roesher. This assembly employs a safety device to monitor the hazardous constituent concentrations in the booth; the monitor also causes air to be exhausted through an exhaust duct rather than the recirculation duct if the concentration exceeds a safe level. However, this patent does not teach the application of a monitor to continually optimize the ventilation system, or dynamically vary the recirculation volume flow, and the advantages thereof. The sole purpose of the monitor is to maintain the enclosure concentration below 25% of the LEL; no monitoring of the recirculation stream is even included. This invention employs a fan and blower system to move the recirculated air at a constant rate, thus the recirculation volume flow rate is constant and unchanging. U.S. Pat. No. 4,515,072 by Crisp also discloses a spray booth that distributes intake ventilation air through the top of the booth. During painting, the booth operates in a "once-through" mode, where 100% of the air is exhausted to atmosphere. After painting, the system switches to recirculation mode, wherein a fixed (95%) percent of ventilation air is recirculated into the booth, and a fixed (5%) of the air is passed to a washer and then to atmosphere. In order to function, this invention relies upon their being laminar flow in the intake ducts (to create the necessary velocity/pressure changes therein) and on a downward air flow from the top of the enclosure. The volumetric flow rates associated with the recirculation and "once-through" modes are fixed; the mode of operation depends only on painting activity in the booth. A monitor is not included in the description, and is therefore not required for ventilation system operation.

In U.S. Pat. No. 5,276,566, techniques for fluctuating the venting of fluid flow from a chamber are identified to control eddy formation around an object in an enclosure. Fluctuation of the direction of fluid flow by varying inlet cross sections or by sliding members across an inlet flow is disclosed. Another embodiment allows the venting of portions of a flow by means of a flapping valve. But the method, structure, and purpose of the fluctuating flow is completely different than in the present invention.

This is the first invention wherein, through variable flows and other features, recirculation is instantaneously maximized to reduce the cost of ventilation air heating and cooling, and reduce the cost of controlling pollutant emissions. These features are needed in the field, as costs of air pollution control and heating/cooling are exceedingly high. This invention is an improvement over prior known systems of this kind.

OBJECTIVES OF THE INVENTION

Accordingly, it is an objective of the present invention to provide an optimized and cost effective ventilation system assembly for use on enclosures that house operations involving solvents or other hazardous materials such as painting, stripping, surface cleaning, and/or curing operations. The cost effectiveness of the ventilation system is ensured by minimizing the enclosure exhaust flow rate on a continuous basis.

It is yet another objective to provide an improved ventilation system that continually minimizes the exhaust volume flow rate, and reduces air pollution control costs to the lowest possible level.

It is a further objective of the invention to reduce facility air handling costs such as heating and cooling, by allowing a maximum volume of air to be recirculated through the enclosure.

In accordance with one aspect of the invention, it is another objective of the invention to enable the construction and operation of such facilities without requiring extensive engineering support to calculate fixed air flow rates; such engineering support must include an adequate safety margin that considers the enclosure configuration and the variability of the process operations that occur within the enclosure.

As a consequence of the latter objective, an advantage of this invention is the avoidance of erroneous calculations of fixed air flow rates, which could be injurious to workers in the enclosure.

SUMMARY OF THE INVENTION

The foregoing and other objectives and advantages are attained by an apparatus and method for adjusting the recirculation and exhaust flow rates on a continuous basis to maintain a constant volume flow rate through an enclosure, yet maximizing recirculation and minimizing the exhaust flow rate. The apparatus comprises a facility that continually optimizes both recirculation and exhaust rates in a ventilation system. The facility utilizes an optimum construction of ducts and mixing/holding areas for air flow. Air flow is varied in recirculation and exhaust ducts through the use of variable frequency drive fans (or fixed fans with dampers or equivalent), which are centrally controlled. An organic or similar analyzer continuously monitors the constituent concentration in the recirculation stream; the recirculation flow rate is dictated by the constituent concentrations detected by the continuous monitor. As the recirculation stream concentration approaches a level deemed unsafe, the central controller automatically reduces the recirculation volume flow rate, and increases the exhaust flow rate. In this way, the recirculation flow rate is continually operated at a maximum safe level, and the exhaust flow rate is continuously minimized. The following monitors may be applicable to this operation: a flame ionization detector (FID) which employ a hydrogen flame to achieve ionization, a photoionization detector (PID) that relies on photolysis for ionization, and a Fourier transform infra-red (FTIR) monitor operated in conjunction with a computer system equipped with appropriate spectrographic software.

In accordance with another aspect of the invention, the apparatus comprises a facility with a fresh make-up air duct assemble for adding fresh make-up air to the recirculation air. Recirculated air mixed with fresh make-up air is then introduced into the enclosure either through and intake face or other intake vent.

This invention is a significant improvement over prior methods and apparatus for such recirculation ventilation systems because it facilitates optimizing ventilation system operation on a continuous basis. I have show and described only the preferred embodiments of the invention, by way of illustration of the best mode contemplated by me for carrying out this invention. As the invention is capable of modification in various obvious aspects, and of different embodiments thereof, the drawings and descriptions are to be regarded as illustrative only, and not restrictive.

DETAILED DESCRIPTION OF PREFERRED EMBODIMENTS AND BEST MODE

Figure 1:
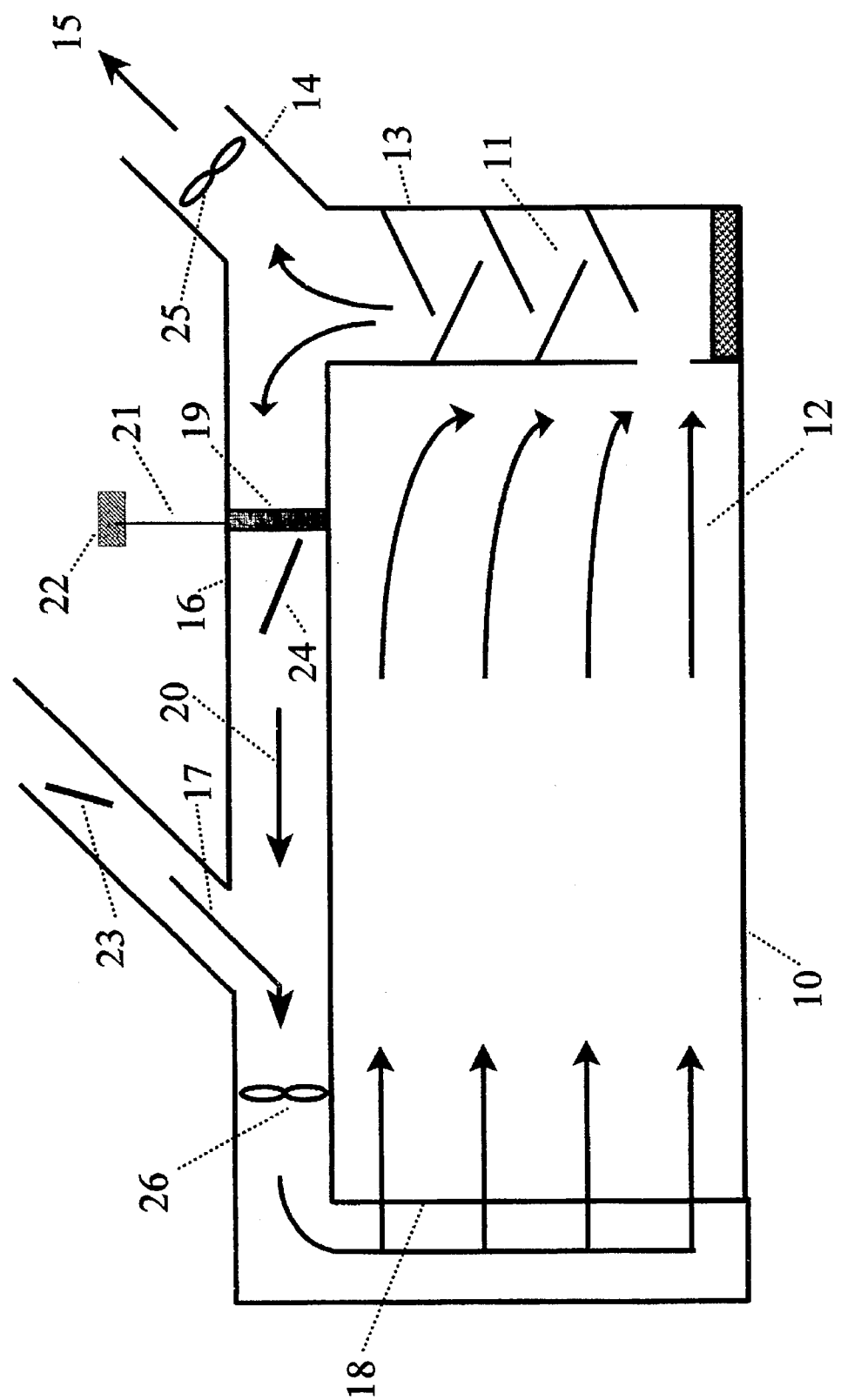
FIG. 1 illustrates an embodiment of the ventilation system assembly according to the present invention. It shows one possible configuration of the invention indicating the integrated assembly comprised of a monitor, control unit, variable air flow system (consisting of fixed fans with adjustable dampers, variable frequency drive [VFD] fans or equivalent), and a water curtain particulate filtration system. In this side view figure, the ventilation air flows horizontally, and possible turbulently, through the enclosure. It enters the enclosure through an intake face or plenum, and exits from an exhaust plenum.

FIG. 1 illustrates one embodiment of the present invention. The enclosure that is illustrated indicates a paint spray booth enclosure (10) that is equipped with a water-curtain particulate emission control system (11). In this configuration, the ventilation air (12) passes through the paint booth enclosure to a water curtain particulate control system (11), where the paint overspray particulate is removed. The ventilation air is then directed to an exhaust plenum (13), from which a portion of the air is directed through the exhaust duct (14) and vented to atmosphere (15). The remainder of the air is directed to a recirculation duct (16), in which it is mixed with fresh make-up air (17) upstream of the recirculation fan (26), and re-introduced into the paint spray booth enclosure (10) through the intake plenum face (18). A monitor (19) that measures concentrations in the recirculation duct (16) upstream of where the fresh make-up air (17) is introduced continuously analyzes the concentration in the recirculation stream (20). The output from the monitor (19) is sent to the central controller (22) via electrical interface, fiber optic cable, or equivalent (21). The central controller (22) controls the recirculation flow rate via the fresh make-up air intake damper (23) and the recirculation damper (24) and controls the exhaust flow rate via the exhaust fan system (25) [comprised of VFD fans or fixed fans with dampers or equivalent]. The central controller (22) adjusts the fresh make-up air intake damper (23), the recirculation duct damper (24), and the exhaust fan system (25) to maintain a constant volume flow rate through the paint booth enclosure (10). As the concentration in the recirculation duct (16) that is detected by the monitor (19) approaches an upper set-point level, the central controller (22) adjusts the fresh make-up air intake damper (23) to increase the fresh intake air volume flow rate, adjusts the recirculation duct damper (24) to reduce the recirculated volume flow rate, and adjusts the exhaust fan system (25) to increase the exhaust volume flow rate. As the concentration in the recirculation duct (16) that is detected by the monitor (19) decreases to below a low set-point level, the central controller (22) adjusts the fresh make-up air intake damper (23) to reduce the fresh intake air volume flow rate, adjusts the recirculation damper (24) to increase the recirculated volume flow rate, and adjusts the exhaust fan system (25) to decrease the exhaust volume flow rate. Employing this configuration, the central controller (22) delivers a constant volumetric flow rate through the paint booth enclosure (10), continually optimizes the recirculation volume flow rate, and reduces the exhaust flow rate to the lowest possible level on a continuous basis.

Figure 2:
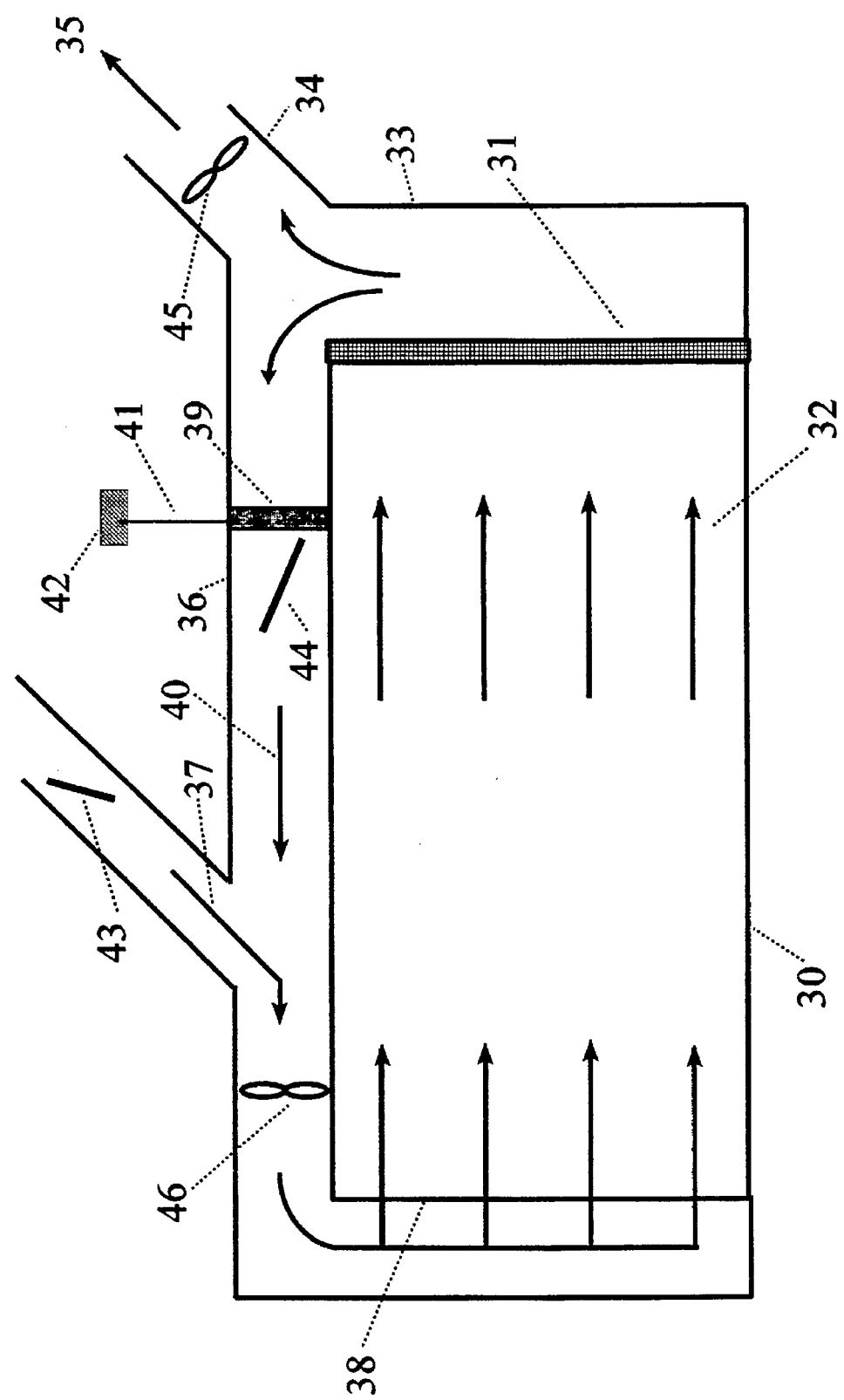
FIG. 2 illustrates a side view diagram of a similar configuration in which a dry particulate filtration system is used in place of the water curtain system of FIG. 1.

FIG. 2 illustrates a second embodiment of the present invention. The enclosure that is illustrated indicates a paint spray booth enclosure (30) that is equipped with a dry filter emission control system (31). In this configuration, the ventilation air (32) passes through the paint booth enclosure (30) to a bank of dry filters (31), where the paint overspray particulate is removed. The ventilation air is then directed to an exhaust plenum (33), where a portion of the air is directed through the exhaust duct (34) and vented to atmosphere (35). The remainder of the air is directed to a recirculation duct (36), in which it is mixed with fresh make-up air (37) upstream of the recirculation fan (46), and re-introduced into the paint spray booth enclosure (30) through the intake plenum face (38). A monitor (39) that measures concentrations in the recirculation duct (36) upstream of where the fresh make-up air (37) is introduced continuously analyzes the concentration in the recirculation stream (40). The output from the monitor (39) is sent to the central controller (42) via electrical interface, fiber optic cable, or equivalent (41). The central controller (42) controls the recirculation flow rate via the fresh make-up air intake damper (43) and the recirculation duct damper (44) and controls the exhaust flow rate via the exhaust fan system (45) [comprised of VFD fans or fixed fans with dampers or equivalent]. The central controller (42) adjusts the fresh make-up air intake damper (43), the recirculation duct damper (44), and the exhaust fan system (45) to maintain a constant volume flow rate through the paint booth enclosure (30). As the concentration in the recirculation duct (36) that is detected by the monitor (39) approaches an upper set-point level, the central controller (42) adjusts the fresh make-up air intake damper (43) to increase the fresh intake air volume flow rate, adjusts the recirculation duct damper (44) to reduce the recirculated volume flow rate, and adjusts the exhaust fan system (45) to increase the exhaust volume flow rate. As the concentration in the recirculation duct (36) that is detected by the monitor (39) decreases to below a low set-point level, the central controller (42) adjusts the fresh make-up air intake damper (43) to reduce the fresh intake air volume flow rate, adjusts the recirculation duct damper (44) to increase the recirculated volume flow rate, and adjusts the exhaust fan system (45) to decrease the exhaust volume flow rate. Employing this configuration, the central controller (42) delivers a constant volumetric flow rate through the paint booth enclosure (30), continually optimizes the recirculation volume flow rate, and reduces the exhaust flow rate to the lowest possible level on a continuous basis.

Figure 3:
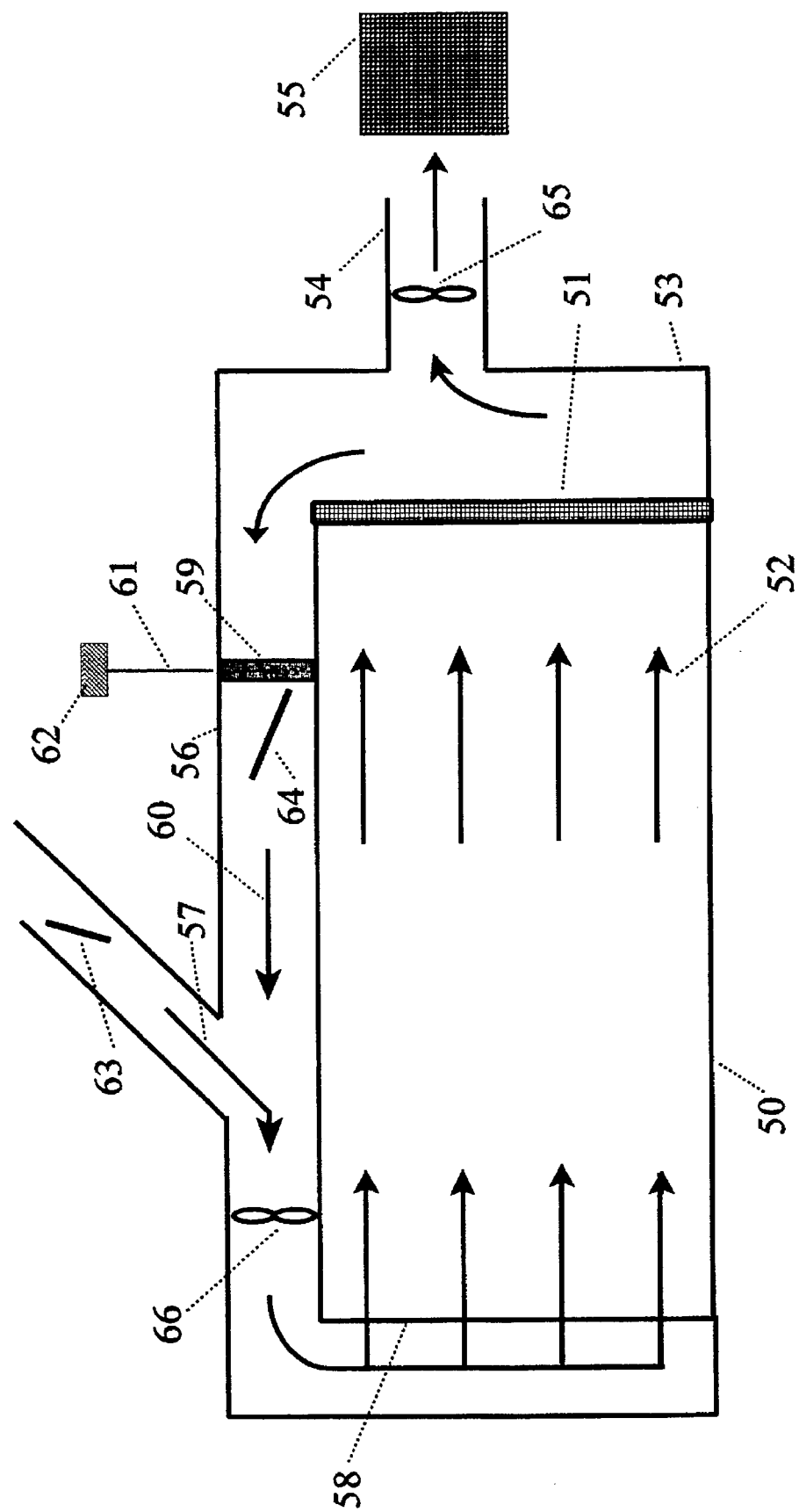
FIG. 3 illustrates a side view diagram of a configuration similar to that indicated in FIG. 2, however the exhaust duct adjoins the exhaust plenum, rather than splitting off the recirculation duct. The optimal location of the exhaust duct is determined based on the enclosure configuration and the airflow dynamics occurring in the exhaust plenum. Thus, for this configuration, the exhaust duct may be located anywhere on the exhaust plenum.

FIG. 3 illustrates a third embodiment of the present invention. The enclosure that is illustrated indicates a paint spray booth enclosure (50) that is equipped with a dry filter emission control system (51). In this configuration, the ventilation air (52) passes through the paint booth enclosure (50) to a bank of dry filters (51), where the paint overspray particulate is removed. The ventilation air is then directed to an exhaust plenum (53), where a portion of the air is directed through the exhaust duct (54) which is directly connected to the exhaust plenum (53) and vented to an air pollution control system (55). The remainder of the air is directed to a recirculation duct (56), in which it is mixed with fresh make-up air (57) upstream of the recirculation fan (66), and re-introduced into the paint spray booth enclosure (50) through the intake plenum face (58). A monitor (59) that measures concentrations in the recirculation duct (56) upstream of where the fresh make-up air (57) is introduced continuously analyzes the concentration in the recirculation stream (60). The output from the monitor (59) is sent to the central controller (62) via electrical interface, fiber optic cable, or equivalent (61). The central controller (62) controls the recirculation flow rate via the fresh make-up air intake damper (63) and the recirculation duct damper (64) and controls the exhaust flow rate via the exhaust fan system (65) [comprised of VFD fans or fixed fans with dampers or equivalent]. The central controller (62) adjusts the fresh make-up air intake damper (63), the recirculation duct damper (64), and the exhaust fan system (65) to maintain a constant volume flow rate through the paint booth enclosure (50). As the concentration in the recirculation duct (56) that is detected by the monitor (59) approaches an upper set-point level, the central controller (62) adjusts the fresh make-up air intake damper (63) to increase the fresh intake air volume flow rate, adjusts the recirculation duct damper (64) to reduce the recirculated volume flow rate, and adjusts the exhaust fan system (65) to increase the exhaust volume flow rate. As the concentration in the recirculation duct (56) that is detected by the monitor (59) decreases to below a low set-point level, the central controller (62) adjusts the fresh make-up air intake damper (63) to reduce the fresh intake air volume flow rate, adjusts the recirculation duct damper (64) to increase the recirculated volume flow rate, and adjusts the exhaust fan system (65) to decrease the exhaust volume flow rate. Employing this configuration, the central controller (62) delivers a constant volumetric flow rate through the paint booth enclosure (50), continually optimizes the recirculation volume flow rate, and reduces the exhaust flow rate to the lowest possible level on a continuous basis.

Figure 4:
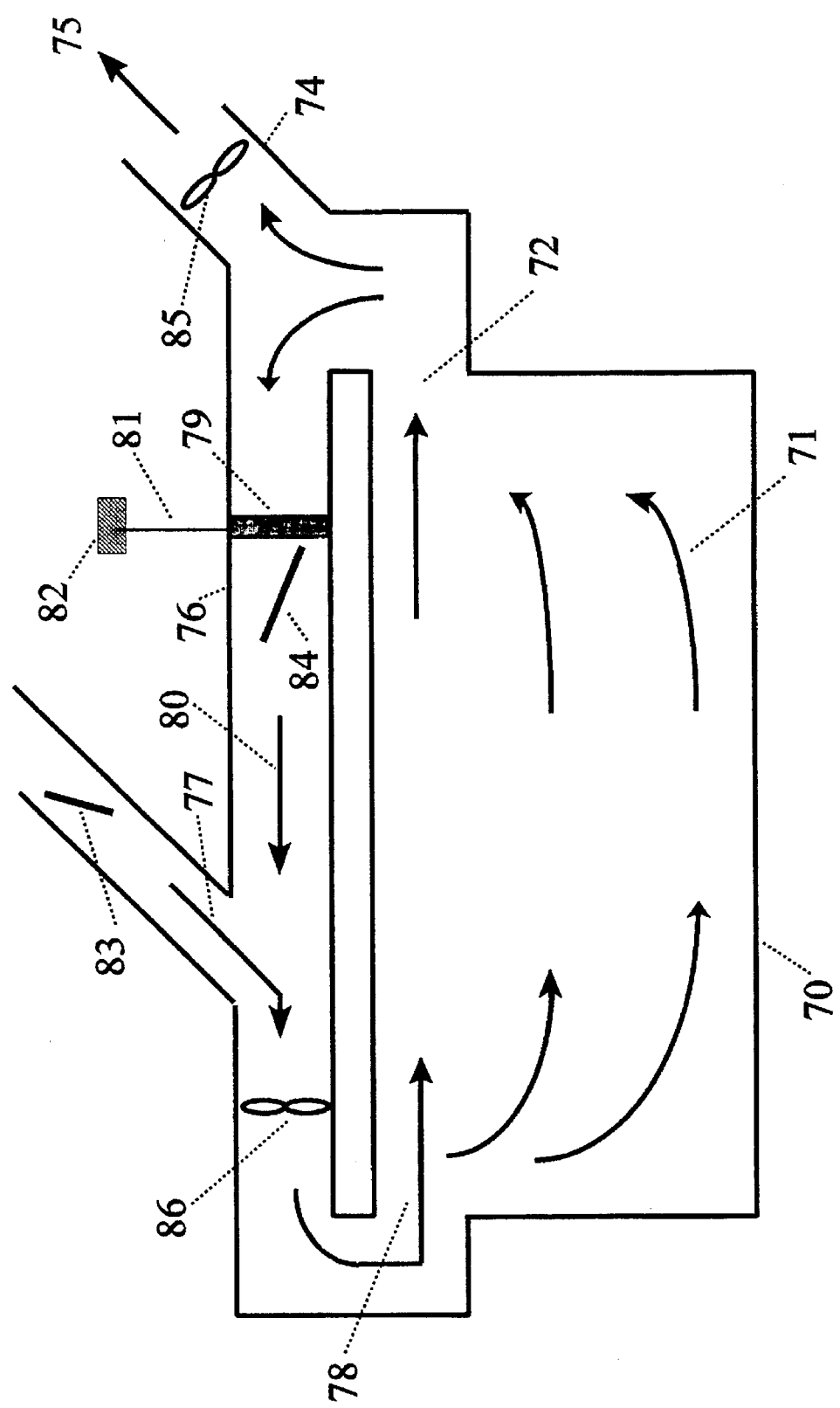
FIG. 4 illustrates an embodiment of the invention in an enclosure which does not employ an intake or an exhaust plenum. In this side figure, the exhaust duct branches off the recirculation duct.

FIG. 4 illustrates a forth embodiment of the present invention. The enclosure that is illustrated indicates a clean room enclosure (70) or other conditioned and climate controlled area. In this configuration, the ventilation air (71) passes through the clean room enclosure (70), and is directed to an exit vent (72). A portion of the ventilation air that passes through the exit vent (72) is then directed to an exhaust duct (74) and vented to atmosphere (75). The remainder of the ventilation air passing through the exit vent (72) is directed to a recirculation duct (76), in which it is mixed with fresh make-up air (77) upstream of the recirculation fan. (86), and re-introduced into the clean room enclosure (70) via an intake vent (78). A monitor (79) that measures concentrations in the recirculation duct (76) upstream of where the fresh make-up air (77) is introduced continuously analyzes the concentration in the recirculation stream (80). The output from the monitor (79) is sent to the central controller (82) via electrical interface, fiber optic cable, or equivalent (81). The central controller (82) controls the recirculation flow rate via the fresh make-up air intake damper (83) and the recirculation duct damper (84) and controls the exhaust flow rate via the exhaust fan system (85) [comprised of VFD fans or fixed fans with dampers or equivalent]. The central controller (82) adjusts the fresh make-up air intake damper (83), the recirculation duct damper (84), and the exhaust fan system (85) to maintain a constant volume flow rate through the clean room enclosure (70). As the concentration in the recirculation duct (76) that is detected by the monitor (79) approaches an upper set-point level, the central controller (82) adjusts the fresh make-up air intake damper (83) to increase the fresh intake air volume flow rate, adjusts the recirculation duct damper (84) to reduce the recirculated volume flow rate, and adjusts the exhaust fan system (85) to increase the exhaust volume flow rate. As the concentration in the recirculation duct (76) that is detected by the monitor (79) decreases to below a low set-point level, the central controller (82) adjusts the fresh make-up air intake damper (83) to reduce the fresh intake air volume flow rate, adjusts the recirculation duct damper (84) to increase the recirculated volume flow rate, and adjusts the exhaust fan system (85) to decrease the exhaust volume flow rate. Employing this configuration, the central controller (82) delivers a constant volumetric flow rate through the clean room enclosure (70), continually optimizes the recirculation volume flow rate, and reduces the exhaust flow rate to the lowest possible level on a continuous basis.

Each of these embodiments are preferred embodiments of this invention, and the best mode for carrying out the invention has been described. In summary, a ventilation system that dynamically optimizes the exhaust flow rate from an enclosure where hazardous constituents or other air pollutants are used, and which employs a monitor to continuously analyze recirculation stream concentrations and thereby determine the optimal recirculation rate is included within the scope of this invention.

The principal of this invention applies to enclosures that employ solvent based or other hazardous material operations. This invention may be used in conjunction with an air pollution control device if appropriate. The advantage of this invention is that it reduces the volume of air exhausted from the enclosure, thereby significantly reducing air handling costs, as well as any associated air pollution control costs.

In summary, any modifications and variations of the disclosure given above that may be apparent to a person skilled in the art are intended to be included within the scope of the invention.

What is claimed is:

1. A method for processing ventilation air from a work area contaminated with hazardous constituents or air pollutants comprising the steps of:

1) monitoring concentrations of the hazardous constituents or air pollutants in air within a recirculation duct;
   2) inputting monitor data to a central controller;
   3) continually adjusting first and second flow varying means by said central controller for the air to atmosphere and the air to the recirculation duct to both deliver a selected flow rate through the work area and optimize the recirculation flow rate to ensure safe concentration levels in the recirculation duct according to monitor data and allowable concentration levels set in said central controller.

2. A method for processing ventilation air from a work area contaminated with hazardous constituents or air pollutants from a work area comprising the stages of:

1) driving air through said work area;
   2) directing a portion of the air through an exhaust duct and then to an air pollution control device or atmosphere;
   3) directing balance of the air to a recirculation duct;
   4) mixing the recirculation air with fresh make-up air;
   5) monitoring concentrations of the hazardous constituents or air pollutants in the recirculation air;
   6) inputting monitor data to a central controller;
   7) continually adjusting first and second flow varying means to both deliver a constant flow rate through the work area and optimize the recirculation flow rate to ensure safe concentration levels in the recirculation duct;
   8) reintroducing the recirculation air back into the work area after air is mixed with fresh make-up air.

3. The method of claim 2 wherein the step of continually adjusting first and second flow varying means is driven by said central controller.

4. The method of claim 3 further comprising the stage of continually adjusting a third flow varying means simultaneously with said adjustment of said first and second flow varying means to vary the flow rate of said fresh make-up air from a make-up air inlet.

5. The method of claim 4 further comprising the stage of varying the exhaust flow rate, the recirculation flow rate, and the make-up air flow rate independently from one another, according to said monitor data and allowable concentration levels, whereby said recirculation flow rate is maximized, and said exhaust flow rate is minimized.

6. The method of claim 5 wherein the stage of continuously varying first, second and third flow varying means independently to maximize said recirculation flow rate further comprises the stages of:

1) checking an upper set-point level and lower set-point level set by said central controller in accordance with allowable concentration levels;
   2) continuously increasing said fresh makeup air flow rate and said exhaust flow rate and decreasing said recirculation flow rate by said central controller when said monitor senses increasing contaminant concentrations that approach said upper set-point;
   3) continuously decreasing said fresh makeup air flow rate and said exhaust flow rate and increasing said recirculation flow rate by said central controller when said monitor senses decreasing contaminant concentrations that approach said lower set-point.

7. The method of claim 3 further comprising the stage of continually varying the ratios between said recirculation flow rates and said exhaust flow rates, according to said monitor data and allowable concentration levels, whereby said recirculation flow rate is maximized, and said exhaust flow rate is minimized.

8. A ventilation system for operating any solvent-based or other operation involving hazardous materials comprising:

1) a work area, having a mixture of air, gas or particulate contained therein, said air having a flow rate;
   2) an exhaust outlet in communication with said work area, through which a portion of said air mixture exiting said work area is driven;

3) a recirculation outlet, in communication with said work area, through which the remainder of said air mixture is driven;

4) a make-up air inlet in communication with said recirculation outlet having fresh make-up air within;

5) a means for optimizing said recirculation and exhaust flow rates continuously to achieve a minimum flow rate through the exhaust outlet and a maximum flow rate through said recirculation outlet, according to allowable contaminant concentrations in said recirculation air, and said work area air, said optimizing means in communication with said recirculation air, said exhaust air and said fresh make-up air;

whereby a minimum volume is exhausted and the maximum volume of air containing the highest contaminant concentrations allowable is passed through said recirculation outlet and may be reintroduced safely back into said work area after being mixed with said fresh make-up air.

9. The invention of claim 8 wherein optimizing means further comprises a first, second, and third means for varying air flow rates respectively in said exhaust outlet, said recirculation outlet, and said fresh make-up air inlet, said first, second, and third means being able to vary flow rates independently of each other, as well as to vary ratios between said flow rates in each of said outlets and inlet.

10. The invention of claim 8 wherein said optimizing means further comprises a means for monitoring constituent concentrations within said recirculation outlet and for generating data and for transmitting signals.

11. The invention of claim 9 wherein optimizing means further comprises a means for controlling said flow varying means using data from said monitoring means; whereby said controlling means directs said flow varying means in response to said monitoring data.

12. The invention of claim 11 wherein controlling means further comprises:

1) means for checking an upper and a lower set-point level set in accordance with allowable concentration levels;

2) means for simultaneously increasing said fresh make-up air and said exhaust flow rates while reducing said recirculation flow rate while the contaminant concentration detected by said monitor increases up to said upper set point;

3) means for simultaneously reducing said fresh make-up and exhaust flow rates while increasing said recirculation flow rate down to said lower set-point.

13. The invention of claim 12 wherein said flow varying means comprises fan means.

14. The invention of claim 13 wherein said fan means comprises a plurality of variable frequency drive fans.

15. The invention of claim 12 wherein said flow varying means comprises 1) a plurality of fixed drive fans; and 2) a plurality of adjustable means for flow restriction, whereby air flow rate is varied.

16. The invention of claim 12 wherein monitoring means comprises 1) a Fourier transform infrared monitor; and 2) a computer system having appropriate spectrographic software, operating from signals received from said Fourier transform infrared monitor.

17. The invention of claim 12 wherein said monitoring means comprises a flame ionization detector.

18. The invention of claim 12 wherein monitoring means comprises a photoionization detector.

19. The invention of claim 11 wherein controlling means comprises a computer control system to vary said flow varying means.

20. The invention of claim 11 wherein controlling means comprises a logic control system to direct said flow varying means.

* * * * *